United States Patent
Reed

[11] 3,816,714
[45] June 11, 1974

[54] COMBINATION TRANSMITTER AND COUNTER DEVICE FOR LIQUID FLOW METER

[76] Inventor: Roy D. Reed, 1033 Cunningham, Corpus Christi, Tex. 78411

[22] Filed: May 31, 1973

[21] Appl. No.: 365,615

[52] U.S. Cl.......... 235/94 R, 235/95 R, 235/144 D, 235/61 M
[51] Int. Cl.......................... G06c 15/42, B67d 5/26
[58] Field of Search.... 235/94 R, 95 R, 61 L, 61 M; 222/27, 28; 73/3

[56] References Cited
UNITED STATES PATENTS

| | | | |
|---|---|---|---|
| 3,233,827 | 2/1966 | Byles | 235/95 R |
| 3,337,127 | 8/1967 | Sundblom | 235/61 M |
| 3,350,939 | 11/1967 | St. Clair | 235/94 R |
| 3,564,591 | 2/1971 | Riddle et al. | 235/94 R |
| 3,688,091 | 8/1972 | Painley | 235/94 R |

Primary Examiner—Stephen J. Tomsky

[57] ABSTRACT

A combination counter and transmitter device for use with a liquid flow meter includes a coupling for connecting the device to the flow meter for rotating a gear on the coupling in response to liquid flow through the meter. A gear train drives counter wheels to count the volume of liquid flow through the meter and interconnected with the gear train is additional gear means for driving a first shaft which may be coupled to a correction arrangement for determining a correction factor to be applied to the volume as shown by the counter wheels of the present invention. The first shaft when not attached to the correction equipment may be employed to operate a sampler in the liquid line or for transmitting pulses or for other uses. Still additional gear means associated with the gear train and interconnected with the gear means that moves the counter wheels and the first shaft means rotates a second shaft means on which are mounted cam means. A switch is pivotally mounted adjacent the cam means and the gear train ratio is such that for each revolution of said second shaft means a predetermined volume of liquid flow will pass through the meter, and as the cam means is rotated by the shaft means, the switch means is actuated to generate a pulse for transmitting to any other desired equipment as an indication of a predetermined flow of liquid through the meter.

8 Claims, 3 Drawing Figures

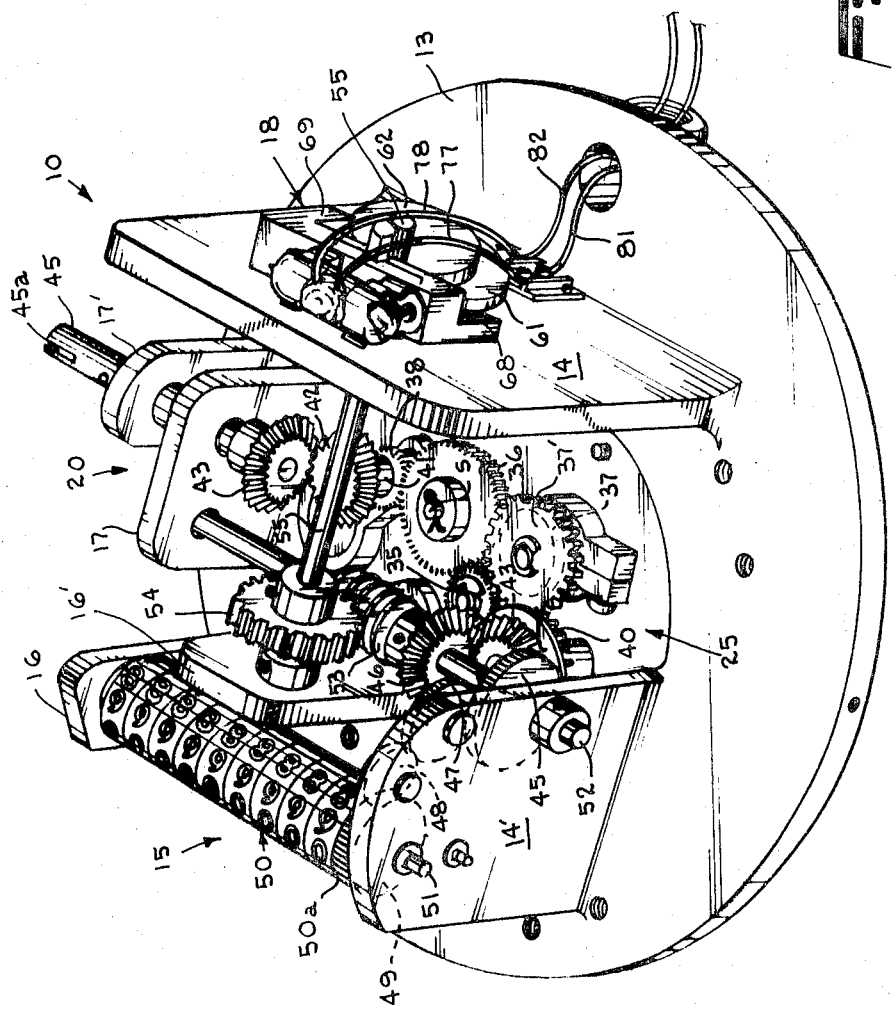

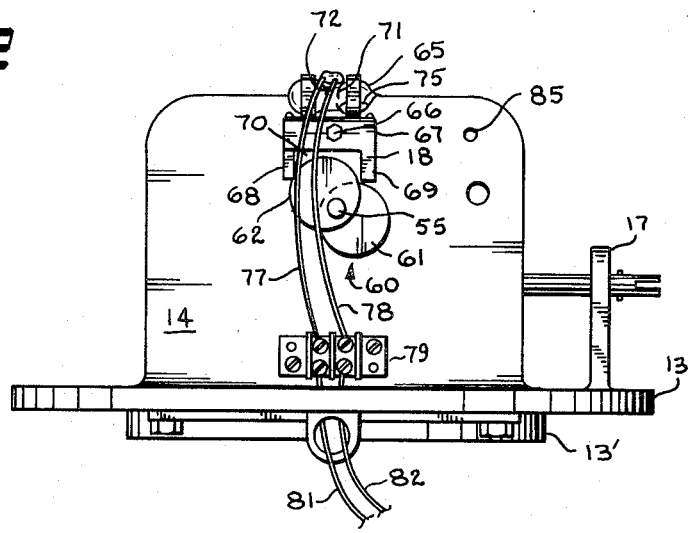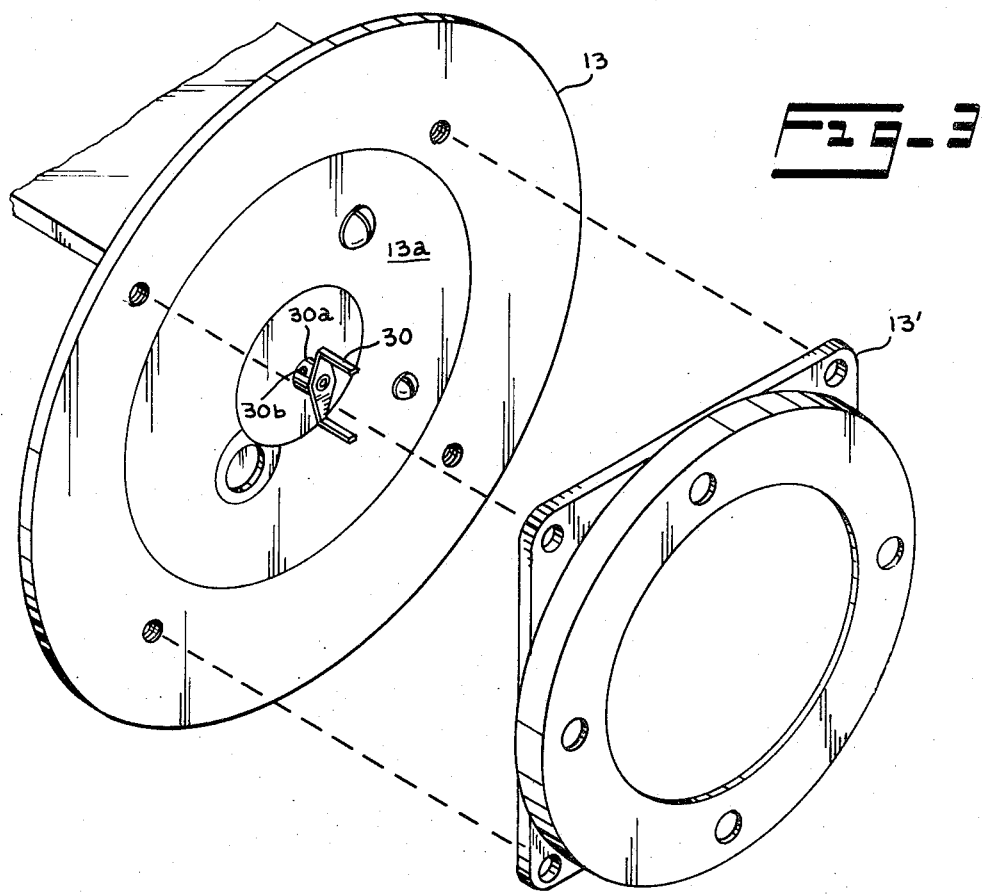

COMBINATION TRANSMITTER AND COUNTER DEVICE FOR LIQUID FLOW METER

SUMMARY OF THE INVENTION

Various prior art devices have been employed for use with liquid flow meters, particularly for use with a liquid flow meter to measure the volume of oil passing therethrough. Such prior art devices normally include some type of transmission device for transmitting pulses and some type of an arrangement, normally referred to as "right angle drive" so that as the meter wears over a period of use, a correction factor may be applied to the volume as indicated by the counter wheels to obtain a true read out of the actual volume of liquid flow through the meter.

The last component at the top of the "stack" with prior art devices was a counter comprising a plurality of rotatable counter wheels for counting the volume of liquid flow through the meter.

Such prior art devices are unsatisfactory in that if the coupling means between the counter drive unit and either the "right angle drive" or the transmitter located therebeneath became twisted off or damaged, liquid flow would continue through the meter and the transmitter would continue to transmit in response to such liquid flow; however, the counter would not function and under such circumstances an unknown volume of liquid flow could occur through the meter without being counted by the counter.

In the present invention, there is a single coupling between the meter, the counter, transmitter, and a shaft which may be employed as the "right angle drive," or may be employed for any other purpose such as transmitting a pulse or operating other equipment. Thus, should the coupling of the present invention between the meter and the device become twisted off or broken the whole unit is shut down and failure to receive pulses indicates that the unit needs repair or replacing to properly record volume flow through the meter.

Also, the gear arrangement of the present invention which drives the counter, "right angle drive" and the transmitter are all interconnected so that should any damage occur to any of the gear means so as to cause malfunction thereof, the present invention shuts down and no pulses will be generated, indicating that the present invention requires attention. Of course, failure of the present invention does not stop the meter and liquid flow continues therethrough.

An object of the present invention is to provide a compact arrangement which combines the counter, right angle drive and transmitter all in an interconnected arrangement so that failure of any component will render the unit inoperative to transmit a pulse and thus indicate that the unit requires attention.

Still another object of the present invention is to provide a gear train arrangement which can be easily replaced in the field and which can be varied as desired so that the transmitter will transmit pulses in response to any desired predetermined liquid flow through the meter.

Still another object of the present invention is to provide a gear train arrangement which can be easily replaced in the field and which can be varied as desired so that the transmitter will transmit pulses in response to any desired predetermined liquid flow through the meter, and wherein such transmitter means includes a shaft means that rotate one revolution for each predetermined volume determined by such gear ratio, said shaft having double cam means thereon whereby switch means pivotally mounted adjacent the shaft means will be actuated twice for each revolution of the shaft or twice for each predetermined volume of liquid for which pulses are to be sent. Thus, the unit is in part self correcting. Still another object of the present invention is to provide a counter and transmitter which is self correcting in that each revolution of the shaft associated with the transmitter is related to a predetermined volume flow through a meter with which the device is to be used and each shaft revolution generates two pulses, or requires that the switch means be activated two times so that at the end of the second pulse, a predetermined known volume of liquid will have passed through the flow meter.

Other objects and advantages of the present invention will become more readily apparent from a consideration of the following description and drawings.

BRIEF DESCRIPTION OF THE DRAWINGS

FIG. 1 is a perspective view illustrating one form of the gear arrangement and the relative interlocking relationship of all of the gear means for actuating the counter, transmitter and so called right angle drive;

FIG. 2 is an end view illustrating in greater detail the double cam arrangement on the shaft means associated with the transmitter and for actuating the switch means pivotally mounted adjacent thereto;

FIG. 3 is an exploded view illustrating the manner in which the bottom plate may be removed for access to the plate on which the gear train is carried for removal thereof to either change the gear ratio or for repair or replacement.

DESCRIPTION OF THE PREFERRED EMBODIMENT

Attention is first directed to FIG. 1 of the drawings wherein the invention is referred to generally by the numeral 10 and is shown as being carried on a circular plate 13, there being a cover (not shown) for the invention 10 having a window for visually observing the counter wheel arrangement referred to generally at 15. The transmitter arrangement is referred to generally by the numeral 18 and the so called "right angle drive" is referred to generally by the numeral 20.

It will be noted that upstanding supports 14, 14', 16, 16', 17 and 17' are provided to support the transmitter, counter wheel arrangement and "right angle drive." As illustrated, such supports are integrally formed with the base plate 13; however, it can be appreciated that they need not be. As shown in FIG. 3 the baseplate 13 is provided with an adapter 13' which may be secured thereto by any suitable means such as bolts or the like for securing the device with a flow meter of any suitable type.

The gear arrangement referred to generally by the numeral 25 in FIG. 1 is carried on a separate circular plate 13a positioned over the hole in the center of the base plate 13 and retained on the base plate 13 by suitable means such as screws or the like so that upon removal of the unit from a meter, such circular plate 13a may be removed to change the gear ratio in the gear means 25 or for repair or replacement thereof in the field. In the center of the circular plate 13 rotatable coupling means 30 are provided for connecting with the meter for rotation of the coupling means 30 by the meter.

The liquid flow meter is of any suitable well known form and may include vanes or other members that are adapted to rotate or move as liquid flow passes through the meter. When this occurs the coupling means 30 is rotated which in turn rotate the drive gear 35. The drive gear in turn imparts rotation to all of the remaining gears of the gear arrangement 25.

A portion of such gear means 25 includes a gear train comprising the idler gear 36 which engages the gear 37 and the gear 38. The gear 37 and the gear 37' rotate in unison on the same support shaft and the gear 37' in turn engages the gear 40. It can be appreciated that the drive gear 35 is connected to the rotatable shaft 30a of the coupling means 30 and is thus carried on the circular plate portion 13a and the gears 36, 37, 38 and 40 are all rotatably supported on such circular plate portion 13a in any suitable manner so that upon removal of the plate portion 13a, and by adding additional gears on the shafts S, the gear ratio of the gear means 25 may be changed as desired.

The gear 38 is carried on a rotatable shaft 41 on which is also carried the beveled gear 42 that engages with the beveled gear 43. A first rotatable shaft means 45 rotatably carried by the supports 17 and 17' is connected with the beveled gear 43 for rotation thereby and for a purpose as will be described in detail.

The gear 40 is provided with a beveled gear 43 which drives the gear 45 and the bevel 46 rotatably supported on shaft 52, which shaft in turn is rotatably supported by support 14' and 17 as illustrated. Gear 45 also rotates gear 47 and gear 47 in turn rotates gear 48 carried on support 14 as well as gear 49.

The counter arrangement 15 is of any suitable well known construction and includes a plurality of rotatable discs on wheels 50 rotatably supported on shaft 51 which extends between support 14' and support 16 so that upon rotation of the gear means 25 rotation is imparted to the first of the counter wheels or discs represented at 50a. Each succeeding counter wheel or disc 50 is driven by the preceding counter wheel or disc through a pinion gear in a manner well known and common to such counter devices. The counter wheels are each marked 0–9 inclusive to visually indicate the volume of liquid flow through the meter with which the invention is used.

Also on the shaft 52 and rotatable therewith is a worm 53 which in turn rotates the gear 54 carried on the rotatable second shaft means 55 which shaft means is rotatably supported by the supports 16' and 14. As better viewed in FIG. 2 of the drawings, the shaft 55 includes cam means referred to generally at 60 which may be in the form of discs 61 and 62 that are eccentrically mounted on the shaft 55 as shown in FIG. 2 of the drawings.

The support 14 also includes switch means 65 pivotally mounted at 66 on the bracket 67 which bracket includes depending spaced projections 68 and 69 providing the void 70 in the bracket 67. The bracket 67 is thus generally of a U-shape and the void 70 between the depending projections 68 and 69 provides clearance for movement of the cam means 60 so that they may alternately engage the depending projections 68 and 69 in a manner as will be described.

The switch means 65 is preferably a mercury switch having the electrodes 71 and 72 extending therein so that as the mercury switch 65 is engaged by the discs 61 and 62 to pivot such mercury switch, the mercury 75 therein will engage the electrodes 71 and 72 thus transmitting a signal through the conduits 77 and 78 to the panel 79 which in turn transmits such pulse through the electrical conduits 81 and 82 to a computer or any other type of mechanism. The conduits 81 and 72 supply electrical energy to the switch 65 so that it will pulse when the mercury 75 therein engages electrodes 71 and 72 to close the circuit.

DESCRIPTION OF OPERATION

Each revolution of the coupling means 30 causes one revolution of the shaft 45 by reason of the gear ratio in the gear means 25. Each revolution of the coupling means 30 can be related to any predetermined volume of liquid flow through the meter such as five gallons, 10 gallons or one barrel, or any other desired volume. Thus, since there is a 1 to 1 ratio between the coupling means 30 and the shaft 45 such shaft 45 may be provided with any suitable coupling means such as the slot 45a therein to enable a device to be attached thereto.

Ordinarily, flow meters are checked at least once a month against a calibrated meter to determine if the amount of liquid flowing through the meter is varying due to wear or other circumstances. Simultaneously, an electronic arrangement well known in the art which forms no part of the present invention is attached to the shaft 45 to determine what correction factor should be applied to the read out as indicated by the counter wheels 50 to obtain a true count of the volume of liquid flow through the meter.

It can be appreciated that the shaft 45 need not extend at right angles as illustrated in the drawings, but that it could extend vertically from gear 38 thus eliminating gear 41 and 42 so as to extend through the top of the housing. Also, such shaft may be used not only for determining what correction factor should be applied to read out as indicated on the counter wheels 50 of the device of the present invention, but it may be used to transmit pulses or for connection with any other device as may be desired.

As previously noted, each revolution of the coupling means 30 is related to a predetermined known flow of liquid volume through the meter with which the present invention is used. For example, it will be either 5 gallon, 10 gallon or 1 barrel, or any other desired predetermined known volume as mentioned previously.

Also, a pulse from the transmitting arrangement or means 18 can be at any predetermined known volume for example 5 barrels, 10 barrels, every barrel, and this can be accomplished by changing the gear ratio in the gear means 25 between the drive gear 35 and the gear 54. If desired, additional gearing may be supplied on the shaft 55 and rotatably carried by support 14 so as to engage the mercury switch 65 if it should be pivotally mounted in the hole 85 as shown in FIG. 3 of the drawings to obtain additional pulses.

When the coupling means 30 rotates, it can be appreciated that all of the gear means 25 rotate thus indicating that everything is in order.

Projection 68 is in a different vertical plane from projection 69 as viewed in FIGS. 1 and 2 to provide for proper contact of cam 61 with projection 68 and contact of cam 62 with projection 69.

The cam discs 61 and 62 cause two pulses to be generated for each revolution of the shaft 55 and by changing the gearing, the rate of rotation of shaft 55 can be speeded up or slowed down, and each pulse generated by the switch 65 will be on any predetermined known volume such as 1 barrel, 10 barrels or any other desired volume.

Also, the position of cams 61 and 62 can be adjusted on shaft 55 so that a pulse can be generated on a predetermined number as indicated on counter wheels 50.

Assume for the purposes of discussion that the gear ratio of the gear means 25 is such that the mercury switch will generate a pulse for each 10 barrels of flow through the meter with which it is to be used. It may well be that the cam 61 will not actuate the switch 65 precisely when 10 barrels, as indicated by the present invention, have passed through the meter;
however, since cam 62 will give a pulse every 20 barrels in the example under discussion, and since the shaft 55 rotates only once for each 20 barrels of flow through the meter, then cam 62 will cause a second pulse to be generated by the mercury switch 65 when 20 barrels of liquid have passed through the meter.

This arrangement prevents any error from multiplying. For example, in the example under discussion if cam 61 should contact the bracket 67 and cause the mercury switch to tilt and generate a pulse at 9 barrels, then the next cam that contacts the bracket 67 and tilts the mercury switch will do so when the present invention has indicated a flow of 20 barrels through the device, since the coupling means 30 and gear means 25 has been set so that shaft 55 will rotate only once for each 20 barrels.

In addition, the coupling means 30 may be connected to the shaft 30a by a shear pin arrangement illustrated at 30b and should the shear pin 30b shear, then rotation of the drive gear 35 is stopped thus shutting down all components of the present invention.

Another advantage of the present invention is that the mercury switch will not come to rest in an activated position and has what might be termed the same dwell time on making and breaking contact regardless of flow rate. For example, if the flow rate is slow, the meter turns slow and in some types of arrangements this would cause the contact to be slowly made and slowly broken. Similarly at a fast flow rate the contact will be made and broken faster.

However, with the mercury switch arrangement 65 of the present invention it makes and breaks each time it is tilted and each time the mercury 75 contacts the electrodes, it goes past the electrodes 71 and 72 substantially at the same speed regardless of the flow rate through the meter and it tends to make contact and break contact instantaneously. As previously noted, the mercury switch construction also prevents the mercury from coming to rest in contact with the electrodes 71 and 72 which would give a false indication.

Thus, should any malfunction in any of the gear means 25 or between the coupling means 30 and the drive gear 30 occur, all components will shut down and no signal will be transmitted from the transmitter means 18 nor will the counter arrangement 15 continue to operate. As previously noted with some prior art devices by reason of the structural arrangement of the counter in relation to the so called right angle drive and transmitter, the coupling arrangement between the counter and either of these two components may have been destroyed so that the counter would not function while the device would continue to transmit pulses. Thus, the counter would not and could not count the volume of liquid flow through the meter.

By interconnecting all three components as in the present invention, failure of any of the gear means or coupling means will shut the entire unit down thus eliminating any pulses and indicating that the unit requires repair or replacement.

The foregoing disclosure and description of the invention are illustrative and explanatory thereof, and various changes in the size, shape, and materials as well as in the details of the illustrated construction may be made without departing from the spirit of the invention.

What is claimed is:

1. A transmitter and counter device for use with a liquid flow meter to transmit and count the volume of liquid flow through the meter comprising:
   a. rotatable coupling means for connecting the device with a liquid flow meter for rotation by the meter;
   b. drive gear means connected to said coupling means and rotatable thereby in response to liquid flow through the meter;
   c. gear train means engaged with said drive gear means and rotatable thereby;
   d. additional gear means engaged with said gear train;
   e. first shaft means connected with said additional gear means and rotatable upon rotation of said additional gear means;
   f. second additional gear means engaged with said gear train;
   g. a plurality of counter wheels engaged with said second additional gear means;
   h. support means supporting said counter wheels for rotation by said second additional gear means; to count the volume of liquid flow through the meter;
   i. third additional gear means engaged with said second additional gear means and rotatable thereby;
   j. second shaft means engaged with said third additional gear means and rotatable thereby;
   k. cam means mounted on said second shaft means and rotatable therewith; and
   l. switch means pivotally supported adjacent said cam means and engagable by said cam means upon rotation of said second shaft means and cam means for transmitting an electrical pulse each time said cam means contacts said switch means in response to a predetermined volume of liquid flow through the meter.

2. The invention of claim 1 wherein said cam means comprises a pair of discs mounted eccentrically on said shaft means to thereby alternately contact and pivot said switch means.

3. The invention of claim 1 wherein each revolution of said coupling means is in response to a predetermined volume of liquid flow through the meter and each revolution of said coupling means rotates said first shaft means one revolution.

4. The invention of claim 3 wherein said first shaft means includes coupling means for receiving a calibration device to provide a correction factor for the transmitter and counter device due to errors in the liquid flow meter with which it is used.

5. The invention of claim 1 wherein said switch means is a mercury switch.

6. The invention of claim 2 wherein said switch means is a mercury switch.

7. The invention of claim 2 wherein said switch means is actuated twice for each revolution of said second shaft means.

8. The invention of claim 7 wherein said second shaft means rotates once for any desired predetermined volume of liquid flow through the meter.

* * * * *